United States Patent [19]

Kuroda et al.

[11] Patent Number: 5,786,408
[45] Date of Patent: Jul. 28, 1998

[54] BIODEGRADABLE POLYESTER RESIN COMPOSITION, AND A BIODEGRADABLE MOLDED ARTICLE

[75] Inventors: Takayuki Kuroda, Ohtake; Masahiko Ono, Himeji; Terumasa Daito, Sakai; Kazushi Watanabe, Ohtake, all of Japan

[73] Assignee: Daicel Chemical Industries, Ltd., Sakai, Japan

[21] Appl. No.: 667,004

[22] Filed: Jun. 20, 1996

[30]    Foreign Application Priority Data

| Jun. 22, 1995 | [JP] | Japan | 7-179348 |
| Jan. 24, 1996 | [JP] | Japan | 8-029988 |
| Jan. 24, 1996 | [JP] | Japan | 8-029989 |
| Jan. 24, 1996 | [JP] | Japan | 8-029990 |
| May 8, 1996 | [JP] | Japan | 8-137593 |
| May 8, 1996 | [JP] | Japan | 8-137594 |

[51] Int. Cl.$^6$ .................................................. C08L 67/04
[52] U.S. Cl. ........................ 523/124; 525/437; 525/440; 525/450
[58] Field of Search ....................... 523/124; 525/437, 525/440, 450

[56]    References Cited

U.S. PATENT DOCUMENTS

| 5,401,778 | 3/1995 | Tokiwa | 523/124 |
| 5,417,679 | 5/1995 | Toms | 523/124 |
| 5,525,671 | 6/1996 | Ebato | 525/437 |
| 5,550,173 | 8/1996 | Hammond | 523/124 |
| 5,593,778 | 1/1997 | Kondo | 525/437 |
| 5,594,076 | 1/1997 | Gordon | 525/411 |
| 5,637,631 | 6/1997 | Kitada | 525/450 |

*Primary Examiner*—Paul R. Michl
*Attorney, Agent, or Firm*—Morgan & Finnegan, LLP

[57]    ABSTRACT

Disclosed are a biodegradable polyester resin composition, and a biodegradable article molded from the composition.

The polyester resin composition and the molded article of the present invention are excellent in biodegradability without any loss of mechanical properties.

14 Claims, No Drawings

BIODEGRADABLE POLYESTER RESIN COMPOSITION, AND A BIODEGRADABLE MOLDED ARTICLE

FIELD OF THE INVENTION

The present invention relates to a biodegradable polyester resin composition. Furthermore, the present invention relates to a biodegradable molded article prepared from the polyester resin composition.

The biodegradable polyester resin composition of the present invention is more excellent in biodegradability regardless of including an aliphatic polyester resin containing or not containing urethane units which has a relatively poor biodegradability.

BACKGROUND OF THE INVENTION

Hitherto, a variety of synthetic resins such as polyethylenes, polypropylenes, polyethylene terephthalates, polycarbonates, polyvinyl chloride, and polyamides, etc. have been used in a large amount as materials for various molded articles, for example, such as wrapping materials, structural materials, and parts for cars or electric appliances, bottles, trays, flowerpots, pots for a seed bed, films, textiles, cloths, and a personal coded card such as a credit card or a prepaid card, etc. owing to their excellence in lightness, beautiful appearance, stability, durability, mechanical properties, moldability, etc., and low price.

The molded articles are usually recovered as wastes, and then occasionally recirculated or regenerated, occasionally burned, and occasionally buried in the ground.

However, articles molded from the synthetic resins cannot be naturally degraded even when disposed in surroundings or circumstances or buried in the ground, because of their durability, for example, weatherability, etc., unpreferably resulting in causing an environmental pollution.

Of the synthetic resins, particularly, polyethylenes and polypropylenes do not nearly quite exhibit biodegradability.

Recently, in order to give biodegradability to synthetic resins which do not nearly quite exhibit biodegradability such as the polyethylenes and polypropylenes, for example, it has been investigated to be mixed with materials having biodegradability such as starches. Furthermore, it has been investigated to give a photo-degradability to polyethylenes and polypropylenes.

Still further, there has been investigated an attempt that the polyethylenes and polypropylenes in which a photo-degradability is given are mixed with starches having biodegradability.

However, mechanical properties are unpractically poor in articles molded from the resins mixed with starches.

In the resins mixed with starches, since starch itself has biodegradability, the molded articles are taken to pieces.

However, the resin itself is remained in surroundings or circumstances without biodegradation, unpreferably resulting in that problems cannot be fundamentally solved.

Even in resins in which a photo-degradability is given, similar situations are present. Furthermore, the resins cannot be semipermanently degraded in circumstances not exposed to light.

Furthermore, in the case when the molded articles are burned, these often damage incinerators because of the high-calorie energy generated in burning thereof, or smoke and soot, acidic gasses such as hydrogen chloride, and chlorine gas which are also harmful for the human, animals, and plants.

Accordingly, methods for disposing of plastic wastes have recently become problematic, and there has been proposed the use of natural material-based resins from which compounds adversely affecting surroundings or circumstances and living bodies are not produced by degradation. As the natural material-based resins, there are exemplified celluloses, starch-based plastics, cellulose-based esters having a low degree of substitution, and further, and a polyester resin produced by microorganisms.

Recently, it is attracted that synthetic polyester resins, particularly, aliphatic synthetic polyester resins exhibit a relatively excellent biodegradability compared to the other synthetic resins. Also, it is known that the aliphatic synthetic polyester resins have well-balanced properties between moldability, costs, mechanical strength, and water resistance.

The aliphatic synthetic polyester resins can be prepared by a polycondensation reaction between an aliphatic bifunctional alcohol and an aliphatic dicarboxylic acid.

However, the aliphatic synthetic polyester resins have a lower melting point. Accordingly, the resins cannot be employed in place of conventional polyolefin resins.

Of the aliphatic synthetic polyester resins, it has been known that a specified polyester resin has a melting point exceeding 100° C., and has a thermoplastic property.

As the specified synthetic polyester resins, there are exemplified a polyester resin prepared from succinic acid and 1,4-butanediol, a polyester resin prepared from succinic acid and ethyleneglycol, a polyester resin prepared from oxalic acid and neopentylglycol, a polyester resin prepared from oxalic acid and 1,4-butanediol, and a polyester resin prepared from oxalic acid and ethyleneglycol. Of those, polyester resins prepared from oxalic acid are poor in a thermal stability, as a result, a molecular weight cannot be increased.

On the other hand, it is known that the succinic acid-based aliphatic polyester resin has a relatively excellent thermal stability.

However, even in the succinic acid-based aliphatic polyester resin, a molecular weight cannot be readily increased by polycondensation with a conventional apparatus, resulting in that there is not prepared a high molecular weight resin having practical mechanical properties.

As a process for increasing the molecular weight of the aliphatic polyester resin, JP-A-4189822/JP-A-4189823 (corresponding to U.S. Pat. No. 5,306,787 and EP 488617), JP-A-5295071, and JP-A-5287042, etc. disclose that a polyisocyanate is employed, resulting in that urethane bonds are formed in combination with hydroxyl groups at terminals in the aliphatic polyester resin. Furthermore, as uses thereof, there are exemplified JP-As-6170941/6171050/6172578/6172621/6246767, and JP-A-6246810, etc. (corresponding to U.S. Pat. Nos. 5,310,872, 5,314,927, 5,314,969, 5,321,052, 5,324,556, 5,324,794, 5,348,700, 5,349,028, 5,360,663, 5,362,765 and EP 569143) in which packaging tapes of bands are disclosed.

According to the JPs, USPs, and EP, it appears that a polyester resin in which there is employed an aliphatic polyisocyanate such as hexamethylene diisocyanate is more excellent than a polyester resin in which there is employed an aromatic isocyanate in biodegradability.

As described hereinabove, it has been unsatisfactorily employed as articles prepared by injection molding, articles prepared by blow molding, textiles, and films by the increase of molecular weight in an aliphatic polyester resin having a low molecular weight.

However, even in the succinic acid-based aliphatic polyester resin, in the case when it has a high crystallinity or in the case when the urethane bonds are formed in the molecule of the resin, biodegradability often unpreferably decreases.

It depends upon a fact that biodegradability usually initiates at non-crystalline portions, and crystalline portions are not readily degraded.

Furthermore, as an aliphatic synthetic polyester resin having excellent biodegradability, polylactone resins are known, and a demand thereof in the market has increased because of being manufactured at a relatively low price and because of a safe biodegradable resin.

The magazine 'Practical and Biodegradable Plastics' (page 42, 1992) published by CMC, Ltd. cites many references described concerning biodegradability of a poly($\epsilon$-caprolactone) resin.

In 1972, Potts et al. found that a poly(ecaprolactone) resin having a high molecular weight (40,000) disappeared after being buried for 1 year [Am. Chem. Soc. Polymer Preprint, 13, 629 (1972)]. In 1975, Diamond et al. reported that a film prepared from a poly(ecaprolactone) resin was degraded by Aspergillus or in soil [Int. Biodetr. Bull., 11, 127 (1975)]. In 1976, Tokiwa et al reported that a poly(ecaprolactone) resin having a number average molecular weight of 25,000 was almost completely degraded in 12 days by a fungus of *Penicillium sp.* strain 26-1 isolated from soil [J. Ferment Technol., 54, 603 (1976)].

Even in the poly($\epsilon$-caprolactone) resin having biodegradability, there is known a fact that if it is combined with a polyisocyanate such as hexamethylene diisocyanate in order to prepare a polyurethane, the polyurethane does not almost exhibit biodegradability in the case of an evaluation of degradation in an active sludge based on JIS K6950.

The fact is coincident with the case of the succinic acid-based aliphatic polyester resin having urethane bonds.

As described above, although polylactone resins such as the poly($\epsilon$caprolactone) resin have excellent biodegradability, the resins have low softening temperatures such as 60° to 70° C., unpreferably resulting in that its practicality is considerably limited in a variety of use fields.

Of the molded articles, for example, a variety of fibers, ropes, textiles, cloths, or nets have been employed in a large amount as industrial materials which are used in fields such as fishery, agriculture, and engineering in which strength and weatherability are particularly required.

In the fields, there have been employed textiles, etc. prepared from polyamides, polyesters, Vinylon, and polyolefines, etc. Such the materials are also recovered as industrial wastes, occasionally burned, occasionally buried in the ground, and exceedingly rarely regenerated or recirculated.

Unfortunately, such the materials are not readily self-degraded, and there is caused a variety of pollution by leaving as it is after the use. For example, not only natural views are devaluated by the materials left as it is, but also birds, marine living things, and even the human, for example, divers in marines are suffered when wastes are disposed in seas. Furthermore, screws of ships are suffered by twining thereof, resulting in causing marine troubles.

In order to solve the above-described problems, there is proposed the use of ropes, textiles, cloths, and nets which are made from a biodegradable material.

As biodegradable materials, there are exemplified fibers, yarns, ropes, textiles, and nets, etc. made from celluloses, polysaccharides such as chitin, proteins or polypeptides such as a regenerated collagen, etc., a poly(alpha-oxyacid) such as a polyglycolide or a polylactide, a poly(beta-hydroxyalkanoate), aliphatic polyesters such as polycaprolactones, etc.

However, there is a problem that in the case when yarns are prepared from the polysaccharides or polypeptides, those must be prepared by a wet-spinning process, and the poly (alpha-oxyacid) is expensive and there cannot be prepared yarns having a high strength. Of the biodegradable materials, although polylactone resins such as the poly (ecaprolactone) resin have excellent biodegradability, the resins have low softening temperatures such as 60° to 70° C., unpreferably resulting in that its practicality is considerably limited in a variety of use fields. Furthermore, as a material having a moderate price, there has been investigated a polyethylene with which starches are mixed. For example, there is practically used a shopping bag made from a low density polyethylene having a straight chain with which approximately 6% of starches are mixed.

Even though products such as fibers, textiles, ropes, or nets, etc. are prepared from such the polyethylene, whole of the products cannot be degraded, and further there remarkably decrease mechanical properties such strength in the products.

Therefore, the polyethylene is not sufficient as industrial materials in a field which require high strength.

A poly(beta-hydroxyalkanoate) which is one of thermoplastic polyesters is a natural product produced by microorganisms, and which has a practical melting point ranging from 130° to 180° C. in the preparation and use of fibers. In a newspaper (Nikkan-Kogyo Shinbun published on Jan. 17, 1992), it is reported that a monofilament having tensile strength of 3 g/d can be prepared from the poly(beta-hydroxyalkanoate). However, it is not reported that multifilaments having practical strength can be prepared because crystallization rate of the poly(beta-hydroxyalkanoate) is slower compared to polyamides and polyethylene terephthalates, unpreferably resulting in that filaments adhere by melting each other on melt spinning and winding thereof.

In order to prevent adhering, in the case when spinning is carried out under conditions in which crystallization sufficiently proceeds, extension is difficult in spinning, and there are only prepared fibers having low tenacity.

Of the molded articles, for example, a variety of films have been employed in a large amount as industrial materials which are used in agriculture fields, and for wrapping a variety of commercial products.

As films in the agricultural fields, there are principally employed a large amount of polyethylene films, polyvinylchloride films, and polyamide films for the purpose of keeping warmth, preventing germination of weeds, preventing spots of farm products, and protecting the farm products, etc.

Furthermore, as films for wrapping, there are principally employed a large amount of polyethylene films, polypropylene films, aromatic polyester films typified by polyethylene terephthalates, and polyamide films.

In the case when the films are used in agricultural fields, those are usually recovered after the uses for a fixed period, and then occasionally burned with an incinerator, or occasionally buried in the ground.

However, recovery requires a large amount of labor or costs and, occasionally, there is also a case in which recovery is difficult. In the case, the films after the uses are of ten let alone as wastes. If the films are not readily degraded in the course of nature, it becomes problematic from a viewpoint of environmental protection.

In the case when the films recovered after the uses are burned in incinerators, those are of ten damaged because of the high-calorie energy generated in burning thereof, or smoke and soot, acidic gasses such as hydrogen chloride, and chlorine gas which are also harmful for the human, animals, and plants.

Furthermore, in the case when the films after the uses are buried in the ground, films not having degradability semi-permanently remain in the ground.

Recently, there has been investigated an attempt that components having biodegradability such as starches are mixed in order to give a degradability to resins not having biodegradability or resins which are difficult to degrade.

Furthermore, there has been investigated an attempt to give a photo-degradability to polyethylenes and polypropylenes.

Still further, there has been investigated an attempt that the polyethylenes and polypropylenes in which a photo-degradability is given are mixed with starches having biodegradability. However, mechanical properties are unpractically poor in the films from the resins mixed with starches. In the resins mixed with starches, since starch itself has biodegradability, the films are taken to pieces.

However, the resin itself is remained in surroundings or circumstances without biodegradation, resulting in that problems cannot be fundamentally solved.

Even in resins in which a photo-degradability is given, similar situations are present. Furthermore, the resins cannot be semipermanently degraded in circumstances not exposed to light.

In the meantime, there are recently employed a large amount of magnetically-coded cards such as prepaid cards, for example, cards for telephones, and commutation tickets for a means of transportation, which are usually disposed after the uses for a relatively short period. Furthermore, there are employed a large amount of personal coded cards such as credit cards, and personal coded cards for cashing or identifying, which are usually disposed after the uses for a passable long period.

Particularly, the use of the prepaid cards has got to increase in which an amount of money capable of being paid is coded as electronic or optical information.

The information in the prepaid cards is generally coded in a magnetically or optically recording portion through a computer for coding and, in the case when the cards are used, the information is identified through a reading portion in a ticket detector unit, etc.

In the cards used through the ticket detector unit, etc., there are required gate properties such as mechanical properties, durability, bending resistance, and rigidity, etc.

As materials for the prepaid cards having the gate properties and capable of being readily prepared, polyethylene terephthalate resins have been principally employed. Although the polyethylene terephthalate resins have excellent-gate properties, the resins do not have biodegradability. Furthermore, JP-A-8039745 discloses that a biodegradable resin comprising an aliphatic polyester resin is employed as materials for the prepaid cards. However, the aliphatic polyester resin alone is not sufficient in biodegradability.

Still further, the personal coded cards for cashing or identifying such as credit cards are generally made from a polyvinylchloride resin. The personal coded cards are also disposed after the uses for a comparatively long period.

As described hereinabove, the polyvinylchloride resin do not have biodegradability and, the resins have the problems in burning.

As materials for the cards having an excellent biodegradability, papers have been recently employed. For example, JP-A-7009788 discloses a material for the cards having an excellent disposable property in which a biodegradable resin is coated on one side or both sides of a substrate composed of papers.

However, although the cards composed of papers have an excellent biodegradability, those are relatively poorer in total applicability as cards such as durability, bending resistance, water resistance, resistance to chemicals, surface smoothness, glossiness, and workability. Accordingly, the cards composed of papers are remarkably limited in the uses, for example, for boarding tickets or admission tickets, etc. which are used only as temporary uses, resulting in that those are unsuitable for the prepaid cards which are repeatedly used for a certain period.

Although there is alternatively proposed a sandwich construction with films made from resins such as polyethylene resins, polypropylene resins, polyvinyl chloride resins, polyethylene terephthalate resins, the resins do not have biodegradability and disposability, resulting in that cards having the sandwich construction is not basically different from cards composed of plastic resins alone in biodegradability.

JP-A-8039745 discloses that a biodegradable resin comprising an aliphatic polyester resin is employed as materials for the prepaid cards. However, the aliphatic polyester resin alone is not sufficient in biodegradability.

In view of this background, and as a result of extensive investigation, the inventors of this invention have now found that there can be prepared a novel biodegradable resin composition having moderate properties without a decrease of practicality owing to a synergetic effect between an aliphatic polyester resin and a polylactone resin, and the present invention has been now completed.

SUMMARY OF THE INVENTION

It is an object of the present invention to provide a biodegradable polyester resin composition.

A first aspect of the present invention relates to a biodegradable polyester resin composition which comprises from 1 to 200 parts by weight of a polylactone resin and 100 parts by weight of an aliphatic polyester resin.

A second aspect of the present invention relates to a biodegradable article molded from the biodegradable polyester resin composition of the first aspect.

DETAILED DESCRIPTION OF THE INVENTION

The present invention will be described hereinafter in more detail.

According to a first aspect of the present invention, there is provided a biodegradable polyester resin composition which comprises from 1 to 200 parts by weight of a polylactone resin and 100 parts by weight of an aliphatic polyester resin.

In the present invention, the terminology "biodegradability" means exhibiting a degradation ratio more than 20%, preferably more than 60% after immersing for 28 days in an active sludge obtained from a municipal drainage regulated by JIS K6950.

Although the aliphatic polyester resin in the present invention is not particularly limited, there preferably is required melting point more than 100° C., and there is required thermoplasticity. The aliphatic polyester resin may contain or not contain urethane bonds.

In the case when urethane bonds are introduced into the aliphatic polyester resins to be employed, aliphatic diisocyanate compounds are preferably employed.

In the case when the aliphatic polyester resins contain urethane bonds, the resins have preferably a number average molecular weight ranging from 10,000 to 200,000, preferably from 30,000 to 100,000, and more preferably more than 40,000.

In the case when the number average molecular weight is below 10,000, mechanical properties in an article molded from the resin composition are unpreferably insufficient and, contrarily, in the case when the number average molecular weight exceeds 200,000, it is difficult to prepare the polyester resin, and the polyester resin exhibits a too high melt viscosity, resulting in that moldability is poor.

In the case when the aliphatic polyester resins do not contain urethane bonds, the resins have preferably a number average molecular weight ranging from 25,000 to 70,000, and more preferably from 40,000 to 70,000.

The aliphatic polyester resins to be employed in the present invention can be prepared by the following processes.

After a glycol and aliphatic dicarboxylic acids or anhydrides thereof are esterified with an excessive amount of glycols until a desired acid value such as 10 or less is obtained, the resultant product is subjected to a reaction for decreasing a glycol in the presence of a reaction catalyst such as a titanium compound, etc. under reduced pressures to prepare a polyesterdiol having a number average molecular weight of at least 10,000 and substantially hydroxyl groups at terminals thereof.

Thus-prepared polyesterdiol in a molten state is optionally allowed to react with a diisocyanate compound such as hexamethylene diisocyanate in an amount ranging from 0.1 to 5 parts by weight based on 100 parts by weight of the polyesterdiol.

As glycols to be employed for preparing the aliphatic polyester, there are specifically exemplified 1,4-butanediol, 1,6-hexanediol, 1,8-octanediol, 1,10-decanediol, ethyleneglycol, and neopentylglycol. Of the glycols, there is preferably employed 1,4-butanediol or 1,6-hexanediol, and ethyleneglycol which have a smaller number of carbon atoms because those can give a polyester a high melting point and permit preparation of an aliphatic polyester resin having excellent moldability. In particular, there is most preferably employed 1,4-butanediol.

As dicarboxylic acids or anhydrides thereof to be employed for preparing the aliphatic polyester, there are specifically exemplified those having a straight chain alkylene group with a carbon atom of 2,4,6,8, and 10 such as oxalic acid, succinic acid, adipic acid, suberic acid, sebacic acid, 1,10-dodecanoic acid, succinic acid anhydride, and a mixture thereof.

Of the dicarboxylic acids or anhydrides thereof, there are preferably employed dicarboxylic acids or anhydrides thereof having a smaller number of carbon atoms such as succinic acid, adipic acid, and succinic anhydride because those can give a polyester a high melting point and permit preparation of an aliphatic polyester resin having excellent moldability.

In particular, there are more preferably employed succinic acid, adipic acid, succinic anhydride, and a mixture composed of succinic acid or succinic anhydride and other dicarboxylic acids such as adipic acid, etc.

In the case when succinic acid or succinic anhydride is employed together with other dicarboxylic acids such as adipic acid, succinic acid is preferably employed in the mol % of more than 70%, and more preferably 90%.

A polyester prepared by a combination of 1,4-butanediol and succinic acid or succinic anhydride has a melting point of 110° to 115° C., and a polyester prepared by a combination of ethylene glycol and succinic acid or succinic anhydride has a melting point of approximately 105° C.

Furthermore, other polyhydric alcohols, polybasic acids, and oxycarboxylic acids can be employed within a limit which does not adversely affect the purpose of the present invention.

Since the aliphatic polyester resin to be employed in the present invention contains substantially hydroxyl groups at the terminals thereof, the glycol components and the acid components or anhydride thereof are essentially allowed to react in a slightly excessive amount of glycol components. The ratio of the glycol components ranges preferably from 1.05 to 1.20 mol based on 1 mol of polybasic acid components.

The aliphatic polyester resin to be employed in the present invention is not limited in processes for the preparation, and an aliphatic polyester resin having high molecular weight can be prepared by esterification or transesterification reaction and then a reaction for decreasing glycol components excessively charged and water or an alcohol produced.

In the reactions, there are preferably employed organometallic compounds such as organo acid salts, alkoxides, acetylacetonate, etc. which are catalysts employed in conventional reactions. As the organo metallic compounds, there are specifically exemplified tetrabutyl titanate, tetraisopropyl titanate, dibutoxy diacetoacetoxytitanium, tetraethoxytitanium, tetrapropoxy titanium, and tetrabutoxytitanium, etc. which are commercially supplied.

The catalysts are employed in an amount ranging from 0.01 to 3 parts by weight, preferably from 0.05 to 2 parts by weight based on 100 parts by weight of polyester resin.

The catalysts may be charged either in the first stage of the esterification reaction or immediately before the reaction for decreasing glycol.

The esterification reaction is carried out at a temperature range from 160° to 230° C., preferably from 180° to 220° C. in an inert gas atmosphere. In the case when the temperature is below 160° C., the reaction unpreferably proceeds slowly, and a resulting product does not exhibit practical properties and, contrarily, in the case when the temperature exceeds 230° C., decomposition is unpreferably caused.

The esterification reaction is carried out until an acid value attains to 15 mgKOH/g or less, preferably 10 mgKOH/g or less. In the case when the acid value exceeds 15 mgKOH/g, the reaction cannot be stably carried out.

The aliphatic polyester resin contains hydroxyl groups at the terminals thereof and a number average molecular weight ranging from 1000 to 3000. The number average molecular weight of the aliphatic polyester resin can be increased by the reaction for increasing molecular weight.

The reaction for increasing molecular weight is carried out at a temperature range from 170° to 230° C., preferably from 180° to 220° C. under high vacuum such as 1 Torr or less from the viewpoint of the reaction rate and prevention of decomposition. In the case when the temperature is below 170° C., the reaction unpreferably proceeds slowly, and a resulting product does not exhibit practical properties and, contrarily, in the case when the temperature exceeds 230° C., decomposition of the product is unpreferably caused.

Thus-prepared aliphatic polyester resin has substantially hydroxyl groups at the terminals thereof and a number average molecular weight (Mn) of at least 5000, preferably at least 10,000 and, a weight average molecular weight (Mw) of at least 15,000, preferably at least 30,000, and molecular weight distribution (Mw/Mn) of at least 2.5.

A severer reduced pressure and a longer period provides a polyester resin having a higher molecular weight.

An aliphatic polyester resin having a low molecular weight, for example, a number average molecular weight (Mn) of approximately 5,000, has the following disadvantages. A resin having excellent mechanical properties cannot be obtained even though using 0.1 to 5 parts by weight of a diisocyanate.

Furthermore, gelation is often caused during a reaction in a melting state even in the use of a small amount of the diisocyanate compound.

The aliphatic polyester resin to be employed in the present invention contains at least one urethane bonds per a number average molecular weight of approximately 5,000.

As the aliphatic diisocyanate compounds to be employed, there are specifically exemplified hexamethylene diisocyanate, methyl ester of lysinediisocyanate [OCN—(CH$_2$)$_4$—CH(—NCO)(—COOCH$_3$)], trimethylhexamethylene diisocyanate, and isophorone diisocyanate, Of those, there are preferably employed hexamethylene diisocyanate and isophorone diisocyanate.

Although the use amount of the aliphatic diisocyanate compounds depends upon the molecular weight of the aliphatic polyester resin, it ranges from 0.1 to 5 parts by weight, preferably from 0. 5 to 3 parts by weight, and more preferably from 1 to 2 parts by weight based on 100 parts by weight of the polyester resin. Furthermore, although it is theoretically optimum for the equivalent ratio of hydroxyl groups to isocyanate groups to be 1, the use of one of the components in excess at an equivalent ratio of approximately 0.5 does not cause problems in practical uses.

The aliphatic diisocyanate compounds are preferably added to the aliphatic polyester resin in a melting state in the absence of solvents under conditions in which agitation can be readily carried out. Furthermore, the aliphatic diisocyanate compounds can be added to the aliphatic polyester resin in a solid state, and the mixture can be melted and mixed in a mixer such as an extruder.

It is already reported in the literature "Story of biodegradable plastics" published by the Association of Japanese Standard (pages 59–66, 1991) that the aliphatic polyester resin containing urethane bonds has biodegradability.

Thus-prepared aliphatic polyester resin has a general formula (1) or (2) described below;

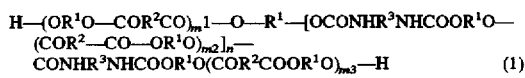

in the formula (1), m1, m2, and m3 by which there is satisfied a number average molecular weight ranging from 10,000 to 200,000 are a polymerization degree which may be identical or different from each other, n is 0 or an integer of not less than 1, R$^1$ and R$^2$ are an alkylene group, a group having an alicyclic ring, and a cycloalkylene group having a carbon number ranging from 2 to 10 which may be branched or substituted by an alkyl group having a carbon number ranging from 1 to 3, and R$^3$ is a residual group derived from a polyisocyanate compound, and

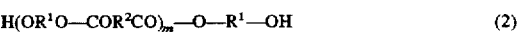

in the formula (2), m by which there is satisfied a number average molecular weight ranging from 25,000 to 70,000 is a polymerization degree, R$^1$ and R$^2$ are an alkylene group, a group having an alicyclic ring, and a cycloalkylene group having a carbon number ranging from 2 to 10 which may be branched or substituted by an alkyl group having a carbon number ranging from 1 to 3.

In the formulae (1) and (2), —(OR$^1$O—COR$^2$CO)$_m$—, —(OR$^1$—COR$^2$CO)$_m$1, —(OR$^1$O—COR$^2$CO)$_m$2—, and —(OR$^1$O—COR$^2$CO)$_m$3— represent a polyester chain derived from polycondensation of a bifunctional aliphatic alcohol with a bifunctional aliphatic carboxylic acid, and R$^1$ and R$^2$ are a residual group derived from the bifunctional alcohol and bifunctional carboxylic acid, respectively.

Although thus-prepared aliphatic polyester resin containing urethane bonds has a relatively passable biodegradability compared to other many synthetic plastics, it is not sufficient.

The aliphatic polyester resin composition of the present invention can be prepared by mixing the aliphatic polyester resin with a polylactone resin, and the composition exhibits a further excellent biodegradability without a loss of other properties.

The polylactone resin is one of thermoplastic resins which has low softening temperatures such as, for example, from 60° to 70° C., and which has an excellent biodegradability.

The polylactone resin can be conventionally prepared by subjecting a lactone monomer such as ε-caprolactone to ring-opening polymerization in the presence of an appropriate catalyst and diols such as ethyleneglycol, diethyleneglycol, and a minor amount of water present in the lactone monomer, etc., as an initiating reagent.

The number average molecular weight can be adjusted by controlling the amount of the minor water and/or the above described initiating agents. In the case when the amount of water and/or the initiating agent is larger, the molecular weight of the resin is lower. On the other hand, in the case when the amount of water and/or the initiating agent is small, the molecular weight of the resin is higher.

The polylactone resin to be employed in the present invention has a number average molecular weight value of from 1,000 to 200,000, preferably from 4,000 to 100,000, and more preferably from 10,000 to 70,000.

In the case when there is employed the polylactone resin having a low number average molecular weight value, although the moldability is preferably increased owing to a low melting viscosity in the resin composition, there unpreferably decreases thermal resistance and mechanical properties in the resulting aliphatic polyester resin composition, resulting in that the use amount is limited and biodegradability is not improved so much.

On the other hand, although there can be also employed the polylactone resin having a number average molecular weight value exceeding 200,000, it is difficult to industrially prepare the resin.

In order to obtain the polylactone resin having a number average molecular weight value ranging from 10,000 to 70,000 to be preferably employed in the present invention, a very minor amount (specifically, 0.025% or less) of water present in the monomer or minor amount of ethyleneglycol is preferably employed as the initiating reagent in the ring-opening polymerization.

In the ring-opening polymerization, a catalyst is preferably used, and as the catalyst used for the ring-opening polymerization, including, for example, an organic tin compound, and a stannous halide and an organic titanium compound.

The catalyst is used in an amount of from 0.1 to 5,000 ppm by weight, based on a lactone monomer. The polymerization temperature is preferably from 100° to 230° C., preferably at inert gas atmosphere in order to obtain a high quality polycaprolactone resin.

Preferred examples of the polylactone resin to be employed in the present invention include PCL H-series (having a number average molecular weight of from 10,000 to 100,000) of the polycaprolactone resin commercially supplied by Daicel Chemical Industries, Ltd.

Of the above described PCL H-series, particularly, there can be more preferably used the polylactone resin having the number average molecular weight of from 50,000 to 70,000 from viewpoint of mechanical properties thereof.

It is noted that the preferred polylactone resin having the above described range of the number average molecular weight corresponds to the resin having a relative viscosity value of from 1.2 to 2.8, which can be produced by polymerizing with the minor amount of water in a lactone monomer and/or ethyleneglycol, etc. as an initiating agent.

There is disclosed a process for the preparation of the polylactone resin having the above-described range of the number average molecular weight in the U.S. Pat. Nos. 4,745,171, 4,357,462, and 4,289,873, etc.

The polylactone resin having the number average molecular weight of from 10,000 to 100,000 has been used for many purposes, for example, a toggle operating body [JP-A-60240692], a composition for a modelling compound [JP-B-91071712], a medical gypsum material [JP-B-88043105], a splint material, a face mask for shielding from radioactive rays, or a modelling material for a periwig [JP-A-60215018], a resin composition [JP-A-63153985], and a plastic modeling kit [U.S. Pat. Nos. 5,088,598 and 5,435,518].

In the polylactone resin to be employed in the present invention, the relative viscosity value is measured by a capillary viscometer (Ubbelohde's viscometer) according to Japanese Industrial Standard K 6726, using toluene solution containing 1% of the resin. The measurement of the relative viscosity value is carried out while maintaining a temperature of 25.00° C.±0.05° C.

As the lactone monomer, there can be employed ecaprolactone, delta-valerolactone, trimethylcaprolactone, and beta-propiolactone, etc. without any limitations. The lactone monomer may be employed solely or in combination.

Furthermore, there can be copolymerized a copolymerizable monomer such as glycolide or lactide together with the lactone monomers, for example, within 20% by weight.

In the biodegradable polyester resin composition of the present invention, the polylactone resin is mixed in an amount ranging from 1 to 200 parts by weight, preferably from 5 to 50 parts by weight, and more preferably from 20 to 40 parts by weight based on 100 parts by weight of the aliphatic polyester resin.

In the case when the polylactone resin is mixed below 1 part by weight, biodegradability is not improved in the aliphatic polyester resin composition so much, unpreferably resulting in that mixing of the polylactone resin becomes meaningless.

On the contrary, in the case when the polylactone resin is mixed exceeding 200 parts by weight, thermal resistance unpreferably decreases in an article molded from the resin composition.

In order to prepare the aliphatic polyester resin composition of the present invention, the polylactone resin and the aliphatic polyester resin are mixed in a dry state with a mixer such as a Henshel mixer or a ribbon blender, followed by being extruded in a melting state with a single or twin screw extruder, a Banbury mixer, a kneader, and a mixing roll, etc. which are conventional mixers to be employed in a melting state.

According to a second aspect of the present invention, there is provided a biodegradable article molded from the biodegradable polyester resin composition of the first aspect.

In the case when the biodegradable article is molded from the biodegradable polyester resin composition, there may be optionally mixed additives such as inorganic fillers such as calcium, carbonate, talc, or silica which are an inorganic delustering agent, coloring agents such as pigments, dyes or carbon black, biodegradable plasticizers such as a polycaprolactone polyol having a low molecular weight, and an ultraviolet ray absorbent, etc.

Furthermore, there may be mixed other biodegradable thermoplastic resins such as a resin prepared from a polyvinyl alcohol, a copolymer of 3-hydroxybutylate with 3-hydroxypivalate, and cellulose-based plastics, starch-based plastics, cellulose-based esters, and a polyester resin produced by microorganisms, etc., within a limit which does not adversely affect.

The biodegradable article molded from the biodegradable polyester resin composition includes textiles, cloths, nets, films, bottles, trays, disposable cups for food and drink, disposable knives, spoons, forks, and disposable and separable chopsticks for eating, flower pots, pots for a seed bed, pipes, containers, syringes, stakes for temporarily fixing lawn mats, tees for golfing, and magnetically or optically coded cards such as a prepaid card or personal coded cards such as credit cards.

The biodegradable polyester resin composition can be molded by injection molding, blow molding, calendar molding, foam molding, inflation molding, and vacuum molding which are conventional molding processes. For example, bottles are usually prepared by blow molding, pots for a seed bed and trays are usually prepared by vacuum molding, films are prepared by inflation molding, casting with a solution, calendar molding, and uniaxial or biaxial extension molding, forks, spoons, stakes, and tees, etc. are usually prepared by sheet molding or injection molding, and magnetically or optically coded cards such as prepaid cards or personal cards such as credit cards are usually prepared by cutting from sheets prepared by a T-die molding, calendar molding and then optionally laminated with plates made from other materials.

Although mechanical properties are different depending upon uses, biodegradable articles molded from the biodegradable polyester resin composition generally require a strength of more than 5 MPa, and preferably more than 10 MPa, and an extension degree more than 0.5%, preferably more than 1.0%.

Temperatures for molding the biodegradable polyester resin composition range from 140° to 220° C., preferably from 180° to 200° C.

Furthermore, the biodegradable polyester resin composition can be also extruded through a spinneret to prepare yarns or fibers, and the yarns or fibers can be also further woven to prepare textiles, cloths, ropes, or nets.

Still further, films molded from the biodegradable polyester resin composition can be also used as split yarns which are prepared by stretching of the films and splitting. The split-yarns can be also woven to prepare cloths or nets.

The thickness of the films can be freely adjusted depending upon uses. For example, the thickness of films for packaging preferably ranges from 5 to 200 microns.

Furthermore, the thickness of films for wrapping foods, etc. preferably ranges from 5 to 100 microns. Still further, the thickness of films for preparing bags for grains, fertilizers, and wastes preferably ranges from 10 to 50 microns for which relatively thick films are required. In addition, the thickness of films for agricultural uses widely ranges from 200 to 600 microns depending upon purposes.

The strength of the films is a range more than 100 kg/cm$^2$, preferably more than 200 kg/cm$^2$. The stretching ratio of the films is a range more than 10%, preferably more than 20%.

Besides, films molded from the biodegradable polyester resin composition can be also laminated with other materials depending upon uses.

The biodegradable polyester resin composition can be also extruded through a spinneret to obtain fibers in a temperature ranging from 140° to 220° C. depending upon the number average molecular weight of the resin composition.

In the case when the temperature is below 140° C., extruding is difficult and, contrarily, in the case when the temperature exceeds 220° C., the polyester resin composition unpreferably decomposes, resulting in that it is difficult to obtain multifilaments having a high tensile strength.

The multifilaments extruded from a spinneret having 10 to 100 holes are air-cooled or wet-cooled at from room temperatures to approximately 80° C., followed by being treated with spinning oils for synthetic fibers. Successively, the multifilaments are stretched in cool or thermal conditions through rolls. Extension ratio ranges from 1.2 to 10, preferably from 4 to 8 in extruding speed of 10 to 1000 m/minute.

Generally speaking, larger stretching ratio can provide filaments having higher tensile strength.

In the case when the extruding speed is below 10 m/minute, stretching becomes difficult because of crystallization and, contrarily, in the case when the spinning speed exceeds 1000 m/minute, multifilaments unpreferably tend to adhere each other.

In the case when the extruding speed is controlled within the range and stretching ratio is within the range, there can be obtained filaments having a tensile strength of at least 2.0 g/denier, preferably at least 3.0 g/denier. In the case when the tensile strength of the filaments is below 2.0 g/denier, filaments cannot be practically used.

The filaments prepared from the biodegradable polyester resin composition of the present invention can be also used without further processing, and the filaments can be bundled, crimped, twisted, woven, and netted to obtain strings, ropes, cloths, and nets which can be used as industrial materials such as ropes and fishing nets, sea weed nets, and fixing nets for agriculture uses, fishery uses, and engineering uses.

Furthermore, cloths woven by fibers prepared from fine filaments can be also used for sanitary products such as wet towels.

Article molded from the biodegradable polyester resin composition of the present invention can be also molded as a sheet for magnetically or optically coded cards such as prepaid cards or personal coded cards such as credit cards.

In the case when the biodegradable polyester resin composition of the present invention is molded as a sheet for the magnetically or optically coded cards, it is generally mixed with 10 to 300 parts by weight, more preferably from 30 to 200 parts by weight of inorganic fillers. As examples of the inorganic fillers, there are exemplified calcium carbonate, mica, calcium silicate, while carbon, asbestos, clays, and glass fibers. Fibrous fillers can increase a bending strength in stretching direction of the sheet for the cards.

Furthermore, there are optionally mixed a variety of additives such as anti-yellowing agents, anti-oxidants, slipping agents, coloring agents such as organic or inorganic pigments The additives are mixed in an amount ranging from 0.05 to 3 parts by weight, preferably from 0.1 to 0.5 part by weight based on 100 parts by weight of resin components.

The sheet for the magnetically or optically coded cards is prepared by a sheet molding process and calendar molding process, and then preferably biaxially-stretched in order to increase rigidity, moldability, mechanical strength, stiffness, impact strength, dimensional stability, and bending resistance, etc.

Furthermore, the sheet for the magnetically or optically coded cards are optionally prepared by lamination with sheets made from other materials which have a passable biodegradability such as plastics produced by microorganisms.

In order to make the thus-prepared sheet work as a prepaid card or personal coded cards for cashing or identifying, etc., magnetically, optically, or thermally recording layers must be formed by coating a paint containing magnetic powders, thermally-sensitive dyes, and binder, or by laminating with a sheet on which the paint is coated.

The thermally-sensitive dyes include a thermally-sensitive leuco dye and thermally-sensitive diazo-based dye, etc.

Furthermore, as recording layers, there can be employed metallic thin layers such as tin or aluminum which have low melting points. On thus-prepared sheet for the prepaid card or personal coded cards for cashing or identifying, etc., visual information such as pictures or letters can be also printed by an offset printing method, a screen printing method, or a gravure printing method.

In order to prepare the cards having a fixed size, thus-prepared sheets are cut with a cutting machine.

The present invention is illustrated below by Examples.

Preparation Example 1

A reaction vessel equipped with an agitator, a tube for removing water, a tube for supplying nitrogen gas, and a vacuum line was charged with 354 parts by weight of succinic acid (Mw: 118), 291 parts by weight of 1,4-butanediol (Mw: 90), and 0.2 part by weight of tetraisopropyl titanate, followed by allowing to react at 200° C. for 2 hours in ordinary pressures and nitrogen atmosphere while agitating. Successively, after internal pressure attained to below 0.5 mmHg by gradually reducing pressures, reactants were agitated at 200° C. for 5 hours while removing water and an excessive amount of 1,4-butanediol from the reaction vessel to obtain a polyester resin. Subsequently, 8 parts by weight of hexamethylene diisocyanate (Mw: 168) was added at 200° C. In a nitrogen atmosphere under ordinary pressures to increase a molecular weight of the polyester resin and to obtain a polyester resin (Polyester Resin A) having urethane bonds.

The Polyester Resin A having urethane bonds exhibited a number average molecular weight of approximately 44,000 and a weight average molecular weight of approximately 185,000 based on a standard Polystyrene with a GPC.

There was mixed 100 parts by weight of the Polyester Resin A with 11.1 parts by weight of a polycaprolactone resin having a number average molecular weight of 70,000

(PCL H7 having the relative viscosity of 2.60 manufactured by Daicel Chemical Industries, Ltd.) at 150° C. In a laboratory mixer which rotates at 30 rpm.

After torque in the mixer became constant, it was further mixed for 10 minutes while heating to obtain a polyester resin composition.

The polyester resin composition obtained was molded with a press equipped with a molding die while heating to obtain a resin sheet having 150 mmL×150 mmW×1 mmT. Molding was carried out at preheating temperature of 150° C. for 10 minutes, and then by compression while heating at the conditions of 150° C., 100 kg/cm² for 10 minutes. The resin sheet molded was removed from the molding die after naturally cooled.

PREPARATION EXAMPLE 2

A reaction vessel equipped with an agitator, a tube for removing water, a tube for supplying nitrogen gas, and a vacuum line was charged with 438 parts by weight of dimethyl succinate (Mw: 146), 291 parts by weight of 1,4-butanediol, and 0.2 part by weight of tetraisopropyl titanate, followed by allowing to react (a transesterification reaction) at 190° C. for 2 hours in ordinary pressures and nitrogen atmosphere while agitating.

Successively, after internal pressure attained to 1–0.5 mmHg by gradually reducing pressures, reactants were agitated at 200° C. for 8 hours while removing methanol produced in the reaction and an excessive amount of 1,4-butanediol from the reaction vessel to obtain a polyester resin. Furthermore, heating was continued at 210 to 220° C. while agitating under a reduced pressure of 1–0.5 mmHg for 5 hours to remove methanol and 1,4-butanediol to obtain a polyester resin (Polyester Resin B).

The Polyester Resin B not having urethane bonds exhibited a number average molecular weight of approximately 38,000 and a weight average molecular weight of approximately 75,000 based on a standard Polystyrene with a GPC.

There was mixed 100 parts by weight of the Polyester Resin B with 11.1 parts by weight of a polycaprolactone resin having a number average molecular weight of 10,000 (PCL HIP having the relative viscosity of 1.28 manufactured by Daicel Chemical Industries, Ltd.) at 150° C. In a laboratory mixer which rotates at 30 rpm. After torque in the mixer became constant, it was further mixed for 10 minutes while heating to obtain a polyester resin composition.

The polyester resin composition obtained was molded with a press equipped with a molding die while heating to obtain a resin sheet having 150 mmL×150 mmW×1 mmT. Molding was carried out at preheating temperature of 150° C. for 10 minutes, and then by compression while heating at the conditions of 150° C., 100 kg/cm² for 10 minutes. The resin sheet molded was removed from the molding die after naturally cooled.

COMPARATIVE PREPARATION EXAMPLE 1

There was mixed 100 parts by weight of the Polyester Resin A in a laboratory mixer which rotates with rotation speed of 30 rpm at 150° C. for 10 minutes until torque in the mixer becomes constant.

COMPARATIVE EXAMPLE 1

The Polyester Resin A mixed in Comparative Preparation Example 1 was molded with a press equipped with a molding die while heating to obtain a resin sheet having 150 mmL×150 mmW×1 mmT. Molding was carried out at preheating temperature of 150° C. for 10 minutes, and then by compression while heating at the conditions of 150° C., 100 kg/cm² for 10 minutes. The resin sheet molded was removed from the molding die after naturally cooled.

COMPARATIVE EXAMPLE 2

The same procedures were followed as in Comparative Example 1, except that the Polyester Resin B was employed.

COMPARATIVE EXAMPLE 3

The same procedures were followed as in Comparative Example 1, except that PCL H7 was employed.

EXAMPLE 1

There were evaluated mechanical properties, thermal stability, and biodegradability in relation to respective resin sheets obtained in Preparation Examples 1, 2 and Comparative

PREPARATION EXAMPLES 1, 2, and 3.

Mechanical properties were measured with Dumbbell test pieces, thermal stability was measured with test pieces having square sheets having the side of 30 mm, melting viscosity was measured with small pieces of resins, biodegradability was measured with powder made from the respective resin sheets.

Results are shown in Table 1.

TABLE 1

|  | Example | | Comparative Example | | |
|---|---|---|---|---|---|
|  | 1 | 2 | 1 | 2 | 3 |
| Strength at break (kg/cm²) | 620 | 340 | 600 | 355 | 610 |
| Extension at break (%) | 560 | 285 | 530 | 280 | 730 |
| Thermal stability (°C.) | 115 | 115 | 118 | 118 | 60 |
| Biodegradability (%) | 36 | 40 | 2 | 15 | 81 |

Measurement of strength at break and extension at break was carried out with Dumbbell Test piece #3 regulated in JIS 7112. Measurement of thermal stability was carried out with a resin plate having 30 mmL×30 mmW×1 mmW. The two plates were placed one upon another, and heated in an oven. There was visually observed a minimum temperature at which adhesion by melting is caused.

Measurement of biodegradability was carried out according to JIS K6950 in which there is measured an oxygen demand in an active sludge. Results are shown by decomposition ratio after immersed for 4 weeks.

PREPARATION EXAMPLE 4

Similar procedures as in Preparation Example 1 were followed, except that the degree of reduced pressure for removing water was more severely increased to obtain an aliphatic polyester resin containing urethane bonds (Polyester Resin C) having a number average molecular weight of 70,000.

There was mixed 100 parts by weight of the Polyester Resin C with 40 parts by weight of a polycaprolactone resin having a number average molecular weight of 70,000 (PCL H7) to obtain a polyester resin composition.

EXAMPLE 3

The polyester resin composition obtained was molded with an injection machine (IS 100E manufactured by Toshiba Kikai) having a die-pressing power of 100 tons while heating to obtain tray having 120 mmL×60 mmW×15 mm-Depth. Molding was carried out at the conditions of a resin temperature of 200° C., a die temperature of 30° C., injection pressure of 700 kg/cm², and injection speed of 60 cm³/second.

The tray obtained was buried in the ground for 3 months, and it was visually observed. Furthermore, the tray was freezedly crushed, and its biodegradability was evaluated by a test according to JIS K6950 (1994) in which there is employed an active sludge obtained from a municipal drainage.

Still further, the tray was immersed in a sterilized water for 3 months, and it was evaluated by visual observation.

Results are shown in Table 2.

PREPARATION EXAMPLE 5

Similar procedures as in Preparation Example 3 were followed, except that there was employed 15 parts by weight of the PCL H7.

EXAMPLE 4

Similar procedures as in Example 3 were followed, except that there was employed the polyester resin composition prepared in Preparation Example 3. Results are shown in Table 2.

PREPARATION EXAMPLE 6

Similar procedures as in Preparation Example 3 were followed, except that there was employed 100 parts by weight of the PCL H7.

EXAMPLE 5

Similar procedures as in Example 3 were followed, except that there was employed the polyester resin composition prepared in Preparation Example 5. Results are shown in Table 2.

COMPARATIVE EXAMPLE 4

Similar procedures as in Example 3 were followed, except that there was employed the Polyester Resin C. Results are shown in Table 2.

TABLE 2

|  | [1] | [2] | [3] |
|---|---|---|---|
| Example 3 | R.D | 83 | N.C |
| 4 | R.D | 45 | N.C |
| 5 | R.D | 87 | N.C |
| Comparative Example 4 | S.D | 2 | N.C |

In the Table 2, [numbering] and abbreviations are as follows.

[1]: Outer appearance after burying in the ground for 3 months

[2]: Decomposition Ratio (%) after immersion for 28 days according to JIS K6950

[3]: Outer appearance after immersing in a sterilized water for 3 months

R.D: Remarkably decomposed

S.D: Slightly decomposed

N.C: No changed compared to before immersing in water.

Table 2 clearly shows that the biodegradable article molded from the aliphatic polyester composition of the present invention has an excellent biodegradability, and it is not degraded in a circumstance in which microorganisms do not exist.

EXAMPLE 6

The polyester resin composition prepared in Preparation Example 3 was extruded to obtain a film at 200° C. The film was first stretched twice in extruding direction at 80° C., and then it was stretched twice in lateral direction to obtain a biodegradable film having the thickness of 50 microns. The biodegradable film obtained was buried in the ground, and the outer appearance was visually observed after 3 months.

The biodegradable film was freezedly crushed, and then its biodegradable property was evaluated according to JIS K6950 (1994) in which there is employed an active sludge obtained from a municipal drainage. Still further, the tray was immersed in a sterilized water for 3 months, and it was evaluated by visual observation. Results are shown in Table 3.

EXAMPLE 7

Same procedures as in Example 6 was followed, except that there was employed the polyester resin composition prepared in Preparation Example 4. Results are shown in Table 3.

EXAMPLE 8

Same procedures as in Example 6 was followed, except that there was employed the polyester resin composition prepared in Preparation Example 5. Results are shown in Table 3.

COMPARATIVE EXAMPLE 5

Same procedures as in Example 6 was followed, except that there was employed the Polyester Resin C. Results are shown in Table 3.

TABLE 3

|  | [1] | [2] | [3] |
|---|---|---|---|
| Example 6 | R.D | 85 | N.C |
| 7 | R.D | 50 | N.C |
| 8 | R.D | 90 | N.C |
| Comparative Example 5 | S.D | 5 | N.C |

In the Table 3, [numbering] and abbreviations are as follows.

[1]: Outer appearance after burying in the ground for 3 months

[2]: Decomposition Ratio (%) after immersing for 28 days according to JIS K6950

[3]: Outer appearance after immersing in a sterilized water for 3 months

R.D: Remarkably decomposed

S.D: Slightly decomposed

N.C: No changed compared to before immersing in water

Table 3 clearly shows that the biodegradable film molded from the aliphatic polyester composition of the present invention has an excellent biodegradability, and it is not degraded in a circumstance in which microorganisms do not exist

EXAMPLE 9

Similar procedures as in Preparation Example 3 were followed, except that there was employed 30 parts by weight of the PCL H7 to obtain a biodegradable polyester resin composition.

The resin composition was extruded through a spinerret having 16 holes with an extruder having the diameter of 25 mm at extruding temperature of 200° C., followed by being air-cooled while extending. Successively, it was extended at a draft ratio of 200, and further it was extended two times to obtain multifilaments having 32 denier (2 denier/monofilament).

The multifilaments exhibited strength at break of G/denier and extension of 40%. Biodegradability was evaluated by burying in the ground thereof for 2 months. The multifilaments exhibited a value less than 50% compared to the original tensile strength value.

EXAMPLE 10

Similar procedures as in Preparation Example 3 were followed, except that there was employed 30 parts by weight of the PCL H7 to obtain a biodegradable polyester resin composition.

The resin composition was extruded through a spinerret having 3 holes with an extruder having the diameter of 25 mm at extruding temperature of CC, followed by being air-cooled while extending. It was further extended 8 times in water of 70° C. to obtain monofilament having 900 denier.

The monofilament exhibited strength at break of 5.5 g/denier and extension at break of 50%. Biodegradability was evaluated by burying in the ground thereof for 2 months. The multifilaments exhibited a value less than 50% compared to the original tensile strength value.

EXAMPLE 11

Similar procedures as in Preparation Example 1 were followed, except that the degree of reduced pressure for removing water was more severely increased to obtain an aliphatic polyester resin containing urethane bonds (Polyester Resin D) having a number average molecular weight of 90,000.

There was mixed 100 parts by weight of the Polyester Resin D with 43 parts by weight of a polycaprolactone resin having a number average molecular weight of 100,000 (PCL H7 manufactured by Daicel Chemical Industries, Ltd.) and 50 parts by weight of mica (HAR160 manufactured by Shiroishi Kogyo, Ltd.), and 8 parts by weight of titanium oxide with a vent-type extruder to obtain a polyester resin composition.

Successively, the resin composition was extruded with a T die-type melt extruder at the molding temperature of 200° C. to obtain a sheet having a fixed thickness.

Successively, the sheet was biaxially stretched and then finished by a calendar process in order to increase surface smoothness to obtain a sheet having the thickness of 190 microns and bending elasticity of 40,000 kgf/cm$^2$ which is a similar value to a sheet prepared from a polyethylene terephthalate resin.

In order to measure biodegradability of the sheet, it was crushed and dried to obtain fine powders, followed by measuring biodegradability according to JIS K6950. It was identified that there was degraded 75% by weight of the resin in the sheet.

Furthermore, it was identified that biodegradability of the Polyester Resin D was 2% by weight, and biodegradability of the polycaprolactone resin was 81% by weight.

Subsequently, the sheet was coated by a magnetic paint containing magnetic powders with a knife coater to form a black colored magnetic recording layer having the thickness of 10 microns, followed by magnetically processing in a horizontal magnetic field having approximately 3000 Gauss and drying with hot air having 100° C. for 3 minutes to obtain a magnetic sheet.

A composition of the magnetic paint is described below.

(a) Magnetic powder (Barium Ferrite having 1750Oe): 100 parts (b) Polyvinyl chloride-polyvinylacetate copolymer (VAGF manufactured by Union Carbide): 20 parts by weight (c) Polyurethane resin (Nippolan 2304 manufactured by Nihon Polyurethane): 30 parts (d) Hexamethylene diisocyanate (Coronate HX manufactured by Nihon Polyurethane): 2 parts (e) Carbon black (#3000 manufactured by Mitsubishi Kasei, Ltd.): 5 parts (f) Dispersant (Gahfack RE-610 manufactured by Toho Kagaku, Ltd.): 3 parts (g) Solvent for dilution (toluene/methylethyl ketone/methylisobutyl ketone): 100 parts The magnetic sheet was cut to obtain a card having 57.5 mmL×85 mmW regulated by a cybernetics standard. Subsequently, the card was passed through a gate of an apparatus for coding and reading with a passing speed of 2 m/second. Any troubles were not observed in the card.

Subsequently, the card was immersed in water for 30 seconds, and water was wiped, and then the card was again passed through the gate of the apparatus for coding in a passing speed of 2 m/second. Any troubles were not also observed in the card. Stiffness of the card was 25 gf/cm, and it was not changed even after immersed in water.

Subsequently, the card was buried in the ground for 4 months to observe biodegradability. After 4 months, shape of the card was not maintained except the magnetic recording layer.

EXAMPLE 12

Similar procedures as in Preparation Example 1 were followed, except that the degree of reduced pressure for removing water was more severely increased to obtain an aliphatic polyester resin (Polyester Resin E) having a number average molecular weight of 52,000.

There was mixed 100 parts by weight of the Polyester Resin E with 50 parts by weight of a polycaprolactone resin having a number average molecular weight of 100,000 (PCL H7 manufactured by Daicel Chemical Industries, Ltd.) and 60 parts by weight of mica (HAR160 manufactured by Shiroishi Kogyo, Ltd.), and 10 parts by weight of titanium oxide with a vent-type extruder to obtain a polyester resin composition.

Successively, the resin composition was extruded with a T die-type melt extruder at the molding temperature of 200° C. to obtain a core sheet having a fixed thickness.

Successively, the core sheet was biaxially stretched and then finished up by a calendar process in order to increase surface smoothness to obtain a sheet having the thickness of 560 microns.

In order to measure biodegradability of the core sheet, it was crushed and dried to obtain fine powders, followed by measuring biodegradability according to JIS K6950. It was identified that there was degraded 80% by weight of the resin in the sheet.

EXAMPLE 13

The polyester resin composition prepared in Example 10 was extruded with a T-die melt extruder at the molding temperature of 200° C. to obtain a sheet having a fixed thickness.

Subsequently, the sheet was biaxially stretched, and then finished up by a calendar process to prepare a covering sheet having the thickness of 100 microns and an excellent smoothness.

The core sheet prepared in Example 11 was laminated by the covering sheets to prepare a laminated sheet having tensile strength of 4.9 kg/cm² and a softening temperature of 100° C.

The laminated sheet has a higher softening temperature than that of a polyvinyl chloride sheet.

The laminated sheet was not changed in spite of being immersed in a liquid paraffin bath maintained at 150° C. for 5 minutes and, as a whole, the laminated sheet exhibited at least nearly same properties as in a polyvinyl chloride sheet.

The laminated sheet was buried in the ground for 4 months in order to observe a biodegradable property. After 4 months, shape of the sheet was not maintained.

It is to be noted that tensile strength was measured according to JIS L1013, a molecular weight was measured with a GPC (Shodex GPC KF-804L manufactured by Showa Denko, Ltd.), an eluent is $CHCl_3$, a sample column is Shodex No. 9506461, the concentration of a polymer solution is 0.1% by weight, sample amount is 200 microliter, flow rate of the sample solution is 1.0 ml/minute, the column temperature is 50° C., pressure is 30 kg/cm², a detector is Shodex RI, and molecular weight is based on a standard Polystyrene.

While the invention has been described in detail and with reference to specific embodiments thereof, it will be apparent to one skilled in the art that various changes and modifications can be made therein without departing from the spirit and scope thereof.

What is claimed is:

1. A polyester resin composition having biodegradability as regulated by JIS K6950 which comprises from 1 to 200 parts by weight of a polylactone resin and 100 parts by weight of an aliphatic polyester resin wherein the aliphatic polyester resin is prepared by a polycondensation reaction between an aliphatic polyvalent alcohol and an aliphatic dicarboxylic acid, wherein said aliphatic polyester resin contains a residual croup derived from an aliphatic polyisocyanate compound.

2. A polyester resin composition as set forth in claim 1, wherein a dicarboxylic acid unit in said aliphatic polyester resin is derived from succinic acid or anhydride thereof.

3. A polyester resin composition as set forth in claim 1, wherein a polyvalent alcohol unit in said aliphatic polyester resin is derived from 1,4-butanediol.

4. A polyester resin composition as set forth in any one of claims 1, wherein said aliphatic polyisocyanate compound is hexamethylene diisocyanate.

5. A polyester resin composition as set forth in claim 1, wherein said aliphatic polyester resin contains units of succinic acid or anhydride thereof, units of 1,4-butanediol, and units of hexamethylene diisocyanate.

6. A polyester resin composition as set forth in claim 1, wherein said polylactone resin has relative viscosity of 1.9 to 2.5 measured with a capillary viscometer according to Japanese Industrial Standard K6726 or a number average molecular weight of 10000 to 70000 measured based on a standard polystyrene with a GPC.

7. A polyester resin composition as set forth in any one of claims 1 and 6, wherein said polylactone resin is derived from E caprolactone.

8. A article molded from the biodegradable polyester resin composition of claim 1.

9. A article as set forth in claim 8, wherein said article is any one of fibers, yarns, textiles or cloths, ropes, nets, films, bottles, pipes, and containers.

10. A article as set forth in claim 8, wherein said article is any one of disposable cups for food and drink, disposable knives, spoons, forks, disposable and separable chopsticks for eating, trays, pots for a seed bed, syringes, stakes for temporarily fixing lawn mats, and tees for golfing.

11. A article as set forth in claim 8, wherein said article is a card having a magnetically-sensitive layer and/or a thermally-sensitive layer.

12. A article as set forth in claim 8, wherein said article is a card prepared by laminating.

13. A article as set forth in claim 8, wherein said article is a card prepared by biaxially-stretching.

14. A article as set forth in claim 8, wherein said article is a card containing fillers.

* * * * *